United States Patent [19]

Lucking

[11] Patent Number: 4,632,362

[45] Date of Patent: Dec. 30, 1986

[54] TAP

[75] Inventor: Anthony J. Lucking, London, England

[73] Assignee: Waddington & Duval Limited, England

[21] Appl. No.: 574,540

[22] Filed: Jan. 27, 1984

[30] Foreign Application Priority Data

Feb. 16, 1983 [GB] United Kingdom ................. 8304244

[51] Int. Cl.⁴ ................................................ F16K 5/04

[52] U.S. Cl. .................................... 251/310; 251/312; 251/345; 222/553

[58] Field of Search ............... 251/310, 312, 345, 352; 222/551, 553

[56] References Cited

U.S. PATENT DOCUMENTS

| | | | |
|---|---|---|---|
| 2,812,882 | 11/1957 | Osaka | 222/553 |
| 3,225,970 | 12/1965 | Rooney | 222/553 |
| 3,561,487 | 2/1971 | Reed, Jr. | 251/310 |
| 4,061,872 | 12/1977 | DeMonsy et al. | 251/345 |
| 4,421,297 | 12/1983 | Pongrass et al. | 251/348 |

*Primary Examiner*—Martin P. Schwadron
*Assistant Examiner*—Sheri M. Novack
*Attorney, Agent, or Firm*—Wood, Herron & Evans

[57] ABSTRACT

A tap made of plastic material for dispensing liquids from containers comprising a body having a cylindrical sleeve portion for attachment to a container from which liquid is to be dispensed, the wall of the cylindrical portion being provided with an outlet hole, a tap member having a hollow cylindrical spigot portion, the outer surface of which fits tightly into the sleeve, while being free to rotate therein, the spigot having an outlet hole which can be brought into and out from, alignment with the outlet hole in the sleeve by turning the spigot and a removable plug to close the open outer end of the hollow cylindrical spigot. Removal of the plug enables the container to which the tap is fitted to be filled through the tap spigot, the spigot being maintained within the sleeve with a tight fit to retain an effective seal.

4 Claims, 2 Drawing Figures

TAP

The present invention relates to taps and in particular, to taps made of plastics material which are used to dispense liquids from containers.

Problems have occurred in the use of such taps of the type which are opened by pressing a button or the like to force a valve element from its seat when the liquid to be dispensed has particles suspended therein, e.g., soft pulp in fruit juice or hard particles such as Guava in Guava juice. This is because the particles can lodge between the valve element and its seat during dispensing which thereafter prevents effective resealing of the element on its seat and allows leakage.

Hence it is desirable to use taps which are opened by rotating one art (a spigot) relative to another part (a sleeve in which the spigot is a relatively tight fit) to align an outlet hole in each part. Such taps also have the advantage that the outlet hole is at the cut-off point-/valve seat which avoids any problems due to the presence of a dead space.

However, if such rotary taps are used with conventional "bag in box" dispensers, problems arise in filling the tap with conventional filling apparatus. Normally, the rotatable spigot is removed from its sleeve which is fixed to the bag and the bag may then be filled through the open ended sleeve. To enable the spigot readily to be removed from the sleeve, it must not be a very tight fit in the sleeve. On the other hand, if the spigot has a relatively loose fit in the sleeve, then leakage can occur between the spigot and sleeve. Furthermore, when filling the bag through the sleeve, liquid tends to escape through the outlet hole on the side of the sleeve.

A tap in accordance with the invention comprises a body having a cylindrical portion (sleeve) for attachment to a container from which liquid is to be dispensed, a wall of the cylindrical portion having an outlet, a tap member having a hollow cylindrical portion (spigot), the outer surface of which fits tightly into the sleeve but is free to rotate therein, the spigot having an outlet hole which can be brought into alignment with the hole of the sleeve by turning the tap and a removable plug to close the outer end of the hollow cylindrical spigot. Removal of the plug enables the container to which the tap is fitted to be filled through the tap (spigot) and sleeve. This means that the spigot is maintained within the sleeve so can be a tight fit therein to retain an effective seal.

The plug is preferably formed with two or more ridges to engage corresponding grooves in the outer end of the spigot. On delivery the plug may then have only the outermost ridge engaged in a groove for easy removal and, after filling, the plug may be pushed firmly into the spigot.

Figure 1:
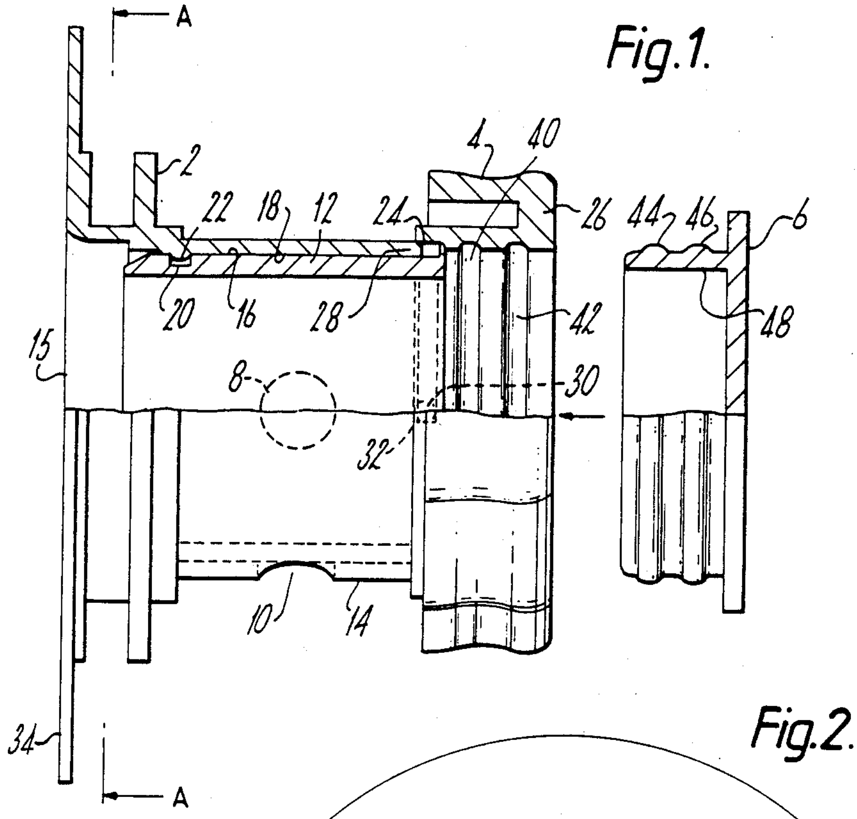
Figure 2:
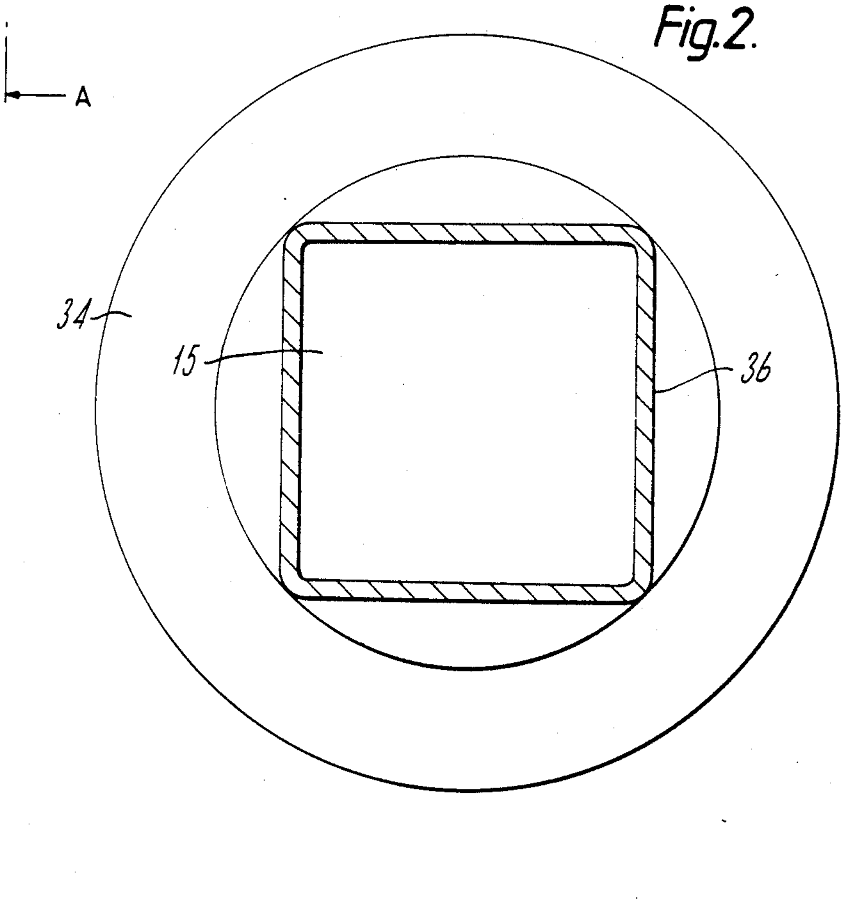

The invention will now be described by way of example with reference to the accompanying drawings in which:

FIG. 1 is a partial cross-section and partial side view of a tap according to the invention, and FIG. 2 is a cross-section of the tap of FIG. 1 taken at A—A of FIG. 1.

The tap shown in the drawings comprises three components, preferably of a plastics material, namely, a body member (sleeve) 2, a tap member (spigot) 4 and a stopper (plug) 6. The tap member 4 is a tight fit in the body member 2 but may be rotated therein to align or misalign an outlet hole 8 in a cylindrical portion 12 of tap member 4 with an outlet hole 10 in a cylindrical portion 14 of the body so as to bring holes 8 and 10 into correspondence so as to open or close a passage between tap inlet 15 and final outlet 10, thereby opening or closing the tap.

The outer surface 16 of cylindrical portion 12 sealingly fits inner surface 18 of cylindrical portion 14 so as to prevent leakage between the body and tap member. A groove 20 in the tap member cooperates with an inwardly projecting ridge 22 on the body to prevent easy separation of the tap member and body.

A groove 24 in the handle 26 receives the outer extremity 28 of the body and a stop 30 in the groove 24 engages with a cut-away portion 32 of the extremity 28 to ensure alignment of the holes 8 and 10 at an open position of the tap.

The tap is normally sealed to its container (bag) by heat sealing the walls of the container (not shown) onto the thin flange 34 extending from the tap body. A square portion 36 of the body around the inlet 15 provides a means for locking the tap body into a corresponding slot in an outer casing (box)—(not shown) of the container into which the tap is sealed. Though other forms of orienting the tap in the container may be provided.

The stopper (plug) 6 fits into the outer end of the tap member 4 (FIG. 1 shows the stopper unplugged). To retain the stopper sealingly in the tap member grooves 40 and 42 are provided in the interior of the handle 26 which engage with ridges 44 and 46 projecting from cylindrical portion 48 of the plug.

Prior to filling, the plug is engaged in the outer groove 42.

One removal of the plug 6 from the tap member 4 a convenient filling inlet for the container is provided by the tap so that the nozzle of a conventional filling machine may pass through the tap into the bag without the tap member (spigot) having to be removed from its sleeve.

I claim:

1. A tap for dispensing a liquid from a container, said tap comprising

- a body member attachable to said container, said body having a cylindrical sleeve portion that defines a tap inlet and a first liquid outlet hole,
- a tap member having a cylindrical spigot portion that defines a second liquid outlet hole, said body member's sleeve portion receiving said tap member's spigot portion in a liquid tight fit therein while permitting said spigot portion to turn relative to sleeve portion, said second outlet hole being alignable with and misalignable from said first outlet hole by turning said spigot portion for permitting and preventing, respectively, liquid flow out of said container when said tap is attached to said container,
- structure that defines a liquid inlet hole in said tap member's spigot portion, said inlet hole communicating through said tap member and said tap inlet in said body member with the interior of said container, and said inlet hole being positioned exteriorly of said container when said tap is attached to said container in order to permit initial filling of said container through said tap if desired, and
- a removable plug received in said tap member's inlet hole to prevent liquid flow out of said inlet hole when said tap is attached to said container and said container is filled with liquid, said plug being temporarily removable from exteriorly of said container to permit initial filling of said container through said tap, inlet in said body member when said first and second outlet holes are misaligned, and said plug being insertable from exteriorly of said container into sealed relation with said tap member's inlet hole after filling of said container through said tap to permit or prevent liquid flow out of said container by aligning or misaligning said first and second outlet holes, said tap member comprising one of at least two ridges and grooves adjacent the outer end of said cylindrical spigot portion, and said plug comprising the other of at least two ridges and grooves, the ridges and grooves on said tap member and said plug cooperating to provide at least a temporary connection therebetween when only one ridge is interengaged in one groove but cooperating to provide a liquid seal tight connection therebetween when both ridges are interengaged in both grooves.

2. A tap as set forth in claim 1, said body member's cylindrical sleeve portion, said tap member's cylindrical spigot portion, and said inlet hole in said tap member's cylindrical spigot portion, all being coaxially oriented relative one to the other.

3. A tap as set forth in claim 2, said tap comprising a handle connected to said tap member's spigot portion, said handle being in the form of a boss extending radially beyond said body member's sleeve portion, said handle being provided for aligning and misaligning said first and second outlet holes.

4. A tap as set forth in claim 3, said handle being in the form of an annular boss coaxially oriented relative to said inlet hole.

* * * * *